United States Patent [19]

Ege

[11] Patent Number: 5,062,566
[45] Date of Patent: Nov. 5, 1991

[54] AUTOMATED CARRIER-STRIP SPLICER

[75] Inventor: Sigmund Ege, Oslo, Norway

[73] Assignee: Kloften & Kloften A/S, Oslo, Norway

[21] Appl. No.: 585,965

[22] Filed: Sep. 21, 1990

[51] Int. Cl.[5] ............................ B23K 1/14; B23K 3/00
[52] U.S. Cl. ...................................... 228/102; 228/5.7; 228/10
[58] Field of Search .................. 228/5.7, 102, 171, 10; 72/203

[56] References Cited

U.S. PATENT DOCUMENTS

| | | | |
|---|---|---|---|
| 3,421,676 | 1/1969 | Jenkins | 228/5.7 |
| 4,067,489 | 1/1978 | Ishioka et al. | 228/5.7 |
| 4,286,489 | 9/1981 | Gullotti et al. | 228/5.7 |
| 4,563,563 | 1/1986 | Ege | 228/5.7 |

Primary Examiner—Samuel M. Heinrich
Attorney, Agent, or Firm—Victor F. Volk

[57] ABSTRACT

A splicing machine for carrier strip is automated to lower the pathway of terminal strip over the splicing jaws and to sense the engagement of the strip by the movement of a guide bar within the jaws that is being pulled forward by the strip.

11 Claims, 5 Drawing Sheets

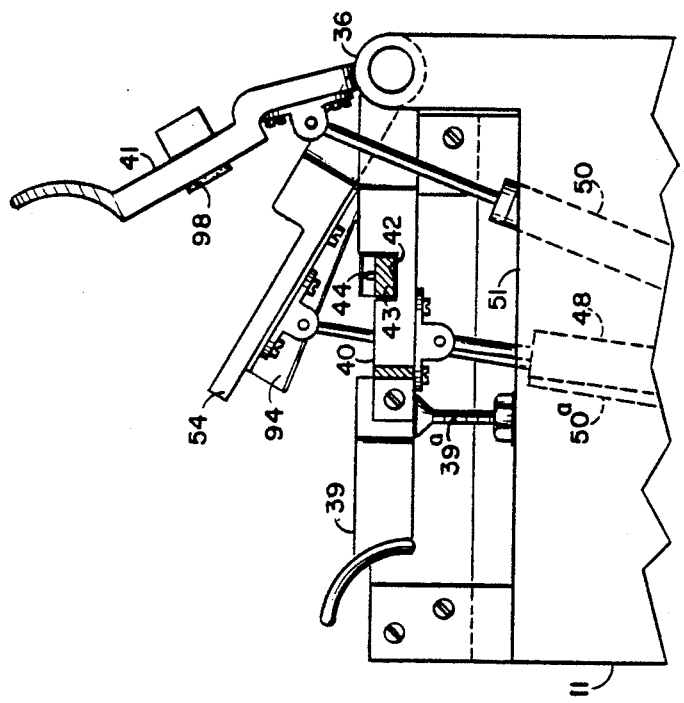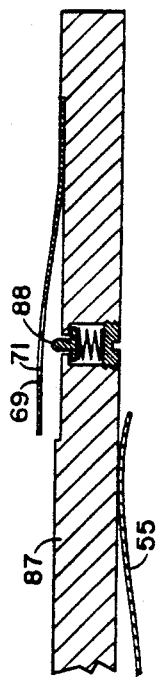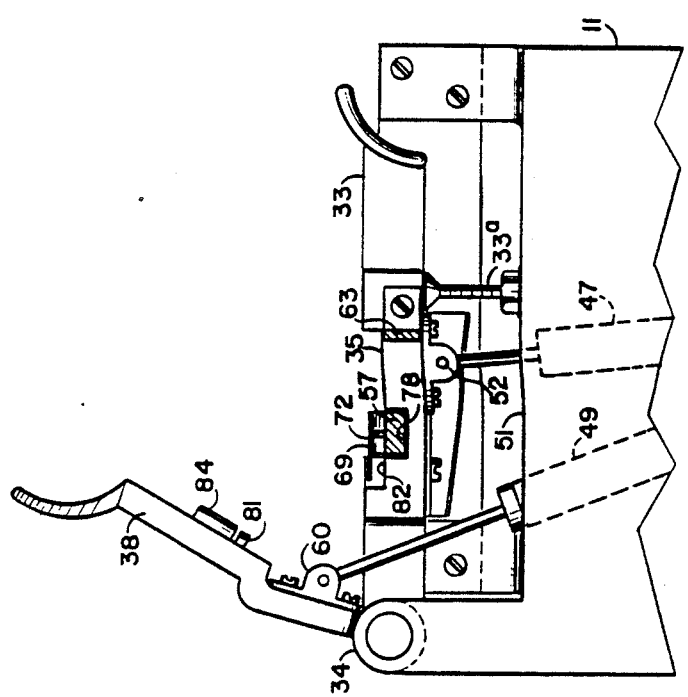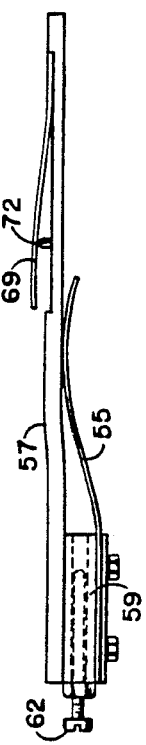

AUTOMATED CARRIER-STRIP SPLICER

BACKGROUND OF THE INVENTION

In my U.S. Pat. No. 4,563,563, the disclosures of which are included herein by reference, I described an apparatus for the silver-solder butt splicing of carrier strip and particularly of connector strip, which comprises a narrow copper-based ribbon to which are attached a large plurality of projecting electrical connector elements. This apparatus is capable of making a splice between two rolls of connector strip rapidly enough to avoid stopping production in the operation that uses the connectors or processes the strip, as by plating. All that is required is an accumulator for strip downstream of the splicer, but the insertion of the tape ends into the splicing apparatus is manual. If the operator fails to note that the strip has run out and to complete the splice before the accumulator is exhausted manufacturing will be interrupted.

SUMMARY OF THE INVENTION

The invention resides in improvements for modifying a known splicing machine to make it partially automatic. The known machine comprises downstream and upstream cooperating jaw sets, and each set is made up of an upper and a lower jaw. The lower jaws have smooth steel plates that are wide enough to enclose the connector strip including its projecting elements, usually connectors. Each of the plates has a flat, lengthwise groove, and the apparatus includes bars that can be removably attached to the the carrier strip and that can slide in the grooves to advance or retract the ends of the strip into precise position for shearing and soldering. It has been known to have mountings for supplies of the carrier strip and an accumulator to provide enough slack for making a splice without interrupting the operation in which the strip is used. It has also been known to provide a pathway from a strip supply to an accumulator that pays into a mechanism for attaching the elements of the strip. In the prior art the trailing end of an downstream strip and a leading end of the upstream strip were clamped manually into the jaw sets, and the bars shifted manually into positions for shearing the ends and splicing them.

In my present improvement the upstream strip is still manually inserted into the upstream jaw set since there is plenty of time for an operator to do this while the downstream supply is running, but the insertion of the downstream end and subsequent operations are performed automatically by my improved structure, which comprises means, such, advantageously, as fluid-pressure piston cylinders, for independently raising and lowering the upper or lower jaws. My improvement also comprises automatically adjustable sprocket-mounting supports for lowering a portion of the pathway of the strip to a position closely above the downstream bar and pressing means, such, advantageously, as a leaf spring projecting downwardly from the upper downstream jaw, for urging the slowly moving strip to engage the downstream bar. Advantageously, the strip ribbons comprise walls that define a plurality of regularly spaced openings and the bars have upwardly projecting pins, engagement of the strip to a bar being accomplished by fitting one of the openings over a pin.

For the apparatus to sense that the bar has become engaged advantage is taken of the downstream motion of the bar, which is caused by the forward movement of the strip now acting against the pin. For the purpose of sensing this bar movement the downstream lower jaw comprises an appropriately placed limit switch. My apparatus also provides means upstream of the downstream jaw set to reverse the motion of the strip until it is in position for shearing. This reversal, and the shearing action, are initiated by the aforementioned limit switch. The shear is attached to an arm which is brought down rapidly and returned eventually. At this time my apparatus projects a narrow band of solder against the upper surface of the strip and the reverse tension on the strip is removed so that it moves forward again with the bar in tow until a precisely adjusted block on the bar strikes a downstream stop. At this point the sheared end of the strip remains under the band of solder, the upstream jaw set is lowered to deposit the sheared end of the upstream strip upon the surface of the solder, a carbon brush is automatically lowered over the area to be spliced to match another brush in the bed of the apparatus, timed current is applied and the solder is fused.

My apparatus then automatically raises both upper jaws and lifts the guide supports to return the carrier strip to its original pathway.

BRIEF DESCRIPTION OF THE DRAWING

FIG. 5 is a side elevation of a partially open jaw set of the apparatus of FIG. 1.

FIG. 6 is a side elevation of the upstream open jaw set of the apparatus of FIG. 1.

FIG. 7 is a side elevation of a guide bar of my apparatus.

FIG. 8 is a side section of an alternative guide bar for my apparatus.

DETAILED DESCRIPTION OF A PREFERRED EMBODIMENT

Figure 1:
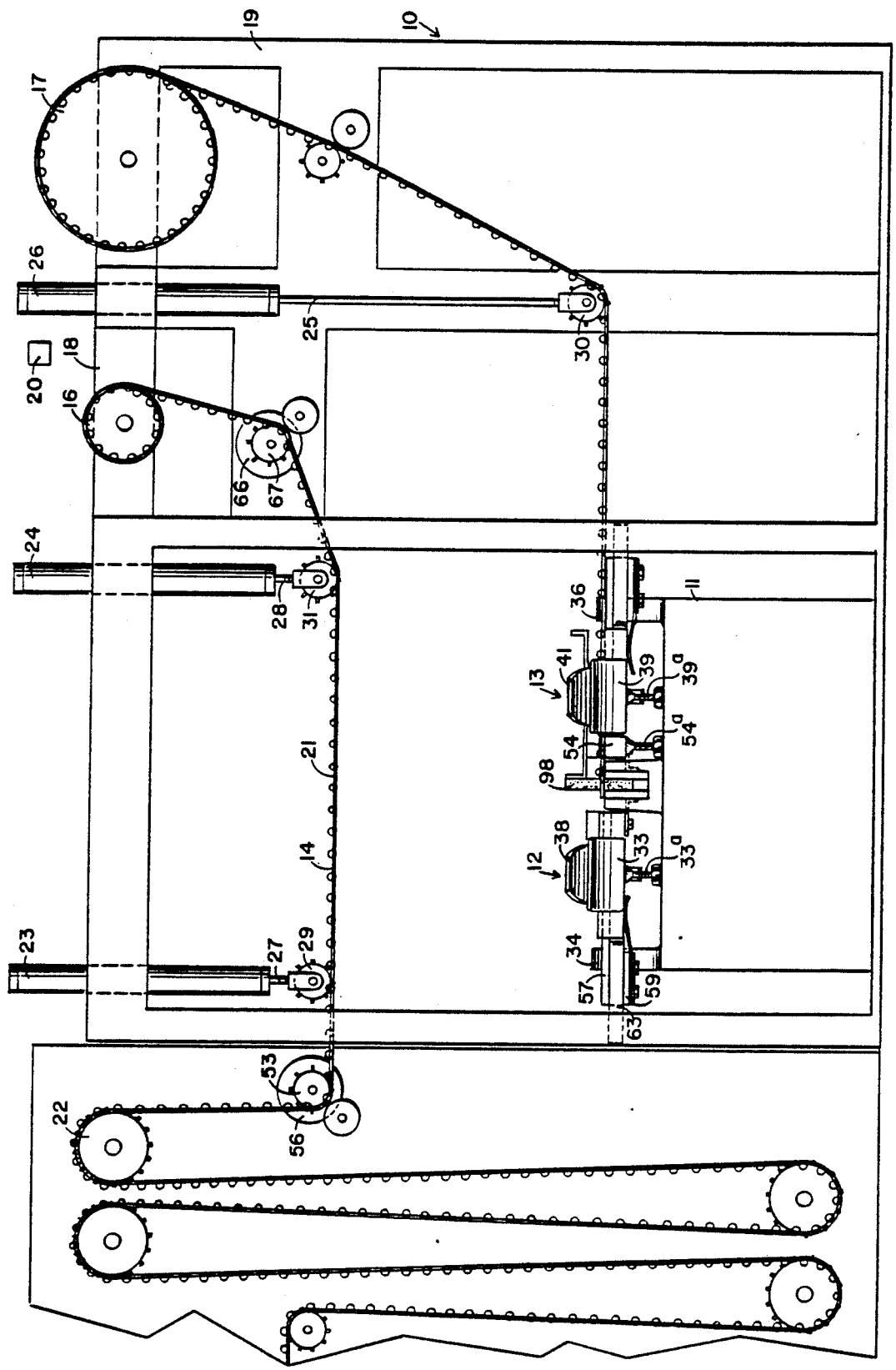
FIG. 1 is a front elevation of my apparatus.

Referring first to FIG. 1, my improved apparatus, indicated generally by the numeral 10, comprises a base 11 for two sets of jaws 12, 13, the former being downstream and the latter upstream with respect to the advance of carrier strip 14 of which there is a downstream supply in the form of a roll 16 and an upstream supply in the form of a roll 17 that are mounted on a beam 18 of a frame 19 that has a fixed spatial relation to the base 11. Supplies other than upright rolls, such, for example, as flat rolls or reels may be used within the scope of my invention. The strip 14 paying from the supply 16 is following a pathway 21 to an accumulator 22 that is upstream of automated machinery (not shown) for assembling the elements of the carrier strip, such as the connectors of a connector strip to electronic devices, but the accumulator might also feed into a plating bath or other processing unit within the scope of this invention. Although the illustrated apparatus 10 includes the accumulator 22 so that the strip 14 can continue to feed into the automatic machinery during the splicing operation my apparatus is also useful in the absence of an accumulator by automatically stopping the machinery during the splicing where such stoppage is tolerable. In the illustrated example the strip 21 is nearing the end of the roll 16 and this end is detected by a sensor 20 of known construction, such as a photo cell to detect a marking tag, or by a proximity switch. If the supplies are very uniform the sensor 20 may be replaced by a strip meter, or even a timer. To the beam 18 are fixed three fluid cylinders 23, 24, 26 comprising piping and controlled by electrically operated valves (not shown for clarity) in a known manner. The cylinders 23, 24 have respective pistons 27, 28 supporting respective sprockets 29, 31 which determine the pathway 21 of carrier strip from the supply 16 and the cylinder 26, which is mounted between the rolls 16 and 17, has a piston 25 and attached sprocket 30. Operating through a programmable logic controller (PLC), not shown, the sensor 20 causes the sprockets 29, 31 to descend and move the pathway 21 to a line that just clears a lower jaw 33 of the downstream jaw set 12. It will be understood that other means of raising and lowering the sprockets 29, 30, such, for example, as rack and pinion posts driven by suitable motors, may also be used within the scope of my invention.

Figure 2:
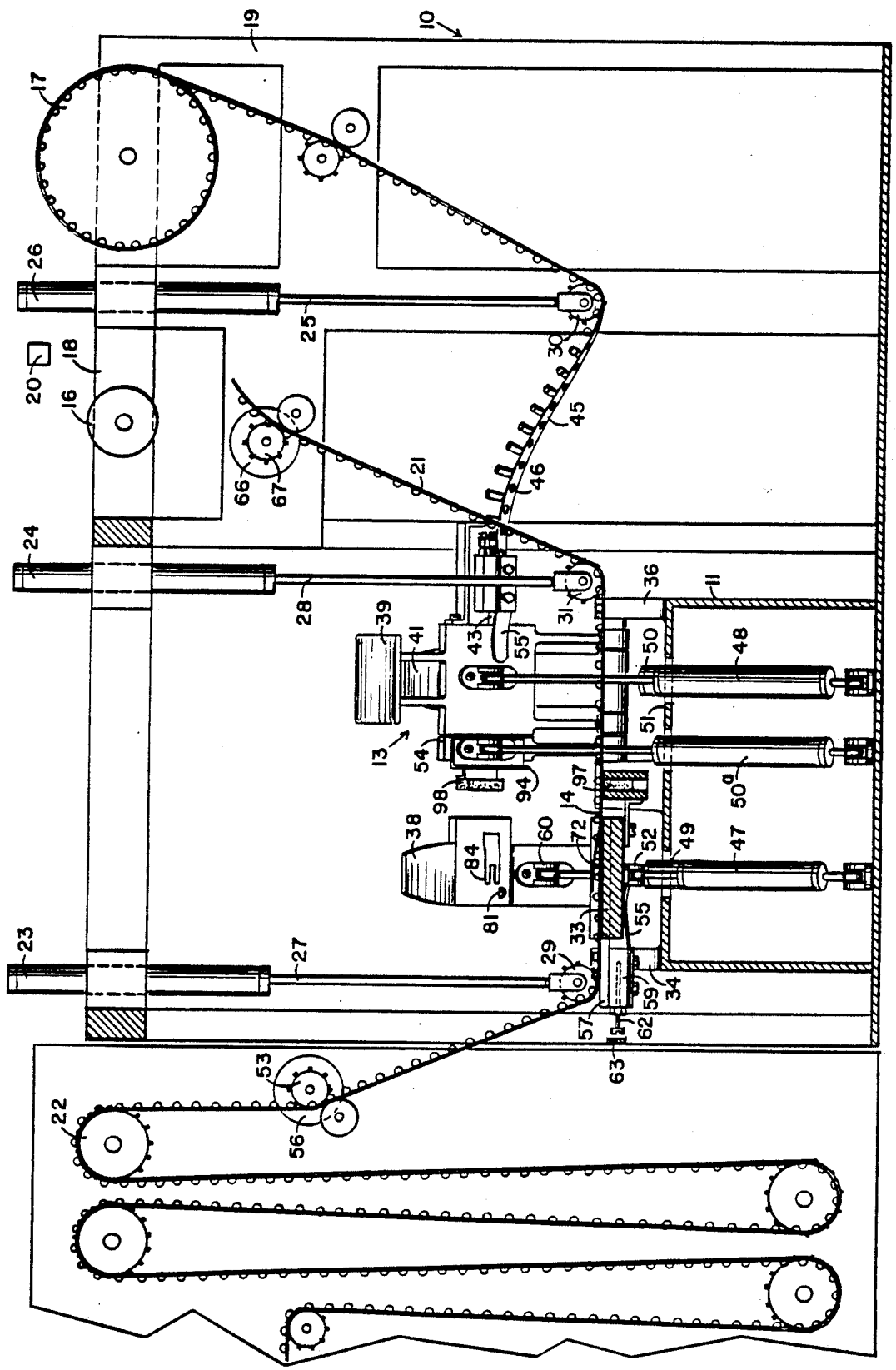
FIG. 2 is a sectionalized front elevation of the apparatus of FIG. 1 with the carrier-strip pathway lowered.

The base 11 bears two standards 34, 36 to support a shaft 37 upon which are hinged the two sets of jaws 12 and 13 which respectively comprise the lower jaw 33 and an upper jaw 38, and a lower jaw 39 and upper jaw 41. The lower jaws 33, 39 come to rest on adjustable stops 33a, 39a. The central surfaces of the lower jaws 33, 39 are machined to provide polished plates 35, 40 on which the carrier strip can slide. Referring to FIGS. 5 and 6 the plate portion of the jaw 39 has been milled to form a groove 42 to slidably accept a guide bar 43 mounting an upright pin 44 that fits into one of a plurality of holes 46 in the carrier strip 14 (FIG. 2). Four fluid cylinders 47, 48, 49, 50 are mounted below an upper platform 51 of the base 11 with their pistons passing through openings provided in the platform 51. These cylinders have electric valves that are wired into the PLC in a known manner. The piston of the cylinder 47 is connected to a lug 52 projecting downwardly from the bottom of the jaw 33 and the piston of the cylinder 48 is similarly connected to a lug on the bottom of jaw 39. When the pistons of either of these cylinders are extended one of the jaw sets 12 or 13 will be swung up and back. The piston of the cylinder 49 connects to a lug 60 projecting downwardly from the upper jaw 38 behind the plate of the jaw 33 so that the jaw set 12 can be opened with the upper jaw 38 separating from the lower jaw 33. Similarly the piston of the cylinder 50 connects to a lug in the jaw 41 while the piston of the cylinder 50a connects to a lever arm 54 for the shear blade 94. An adjustable stop 54a provides support for the arm 54 when it is lowered.

A sprocket 53 on a stationary mounting (FIG. 1) in the line of the pathway 21 can be automatically connected by a clutch (not shown) under control of the PLC to a torque motor 56 that will severely slow down the forward motion of the strip 14 during the splicing operation which requires only about 20 seconds. At the downstream end portion of a bar 57 there are affixed tapped blocks 58 and 59 for respective threaded stop-screws 61, 62. The jaw 33 comprises an angle whose flange 63 provides a stop for the stop-screw 62 which determines the final splicing position of the downstream length of strip, and a downstream end of the stop-screw 61 contacts a limit switch 64 which is wired through the PLC to energize a torque motor 66 to drive a sprocket 67 slowly in reverse so that the strip and bar are moved slowly upstream until the upstream end of the stop-screw 61 strikes an edge 68 of the jaw 33.

A leaf spring 69 fits a recessed area of the upper surface of the bar 57 so that it is precisely flush with the top of the bar when it is pressed down. The spring 69 has an opening 71 to accept a pin 72 which is the equivalent of the pin 44 in the upstream bar 43. The plate 35 is defined by square cut shoulders 73, 74 as is the plate 40 by the shoulders 76, 77. These shoulders precisely fit the width of the carrier strip 14 so that, in combination with the pins 44, 72 they hold the strips in alignment. A lengthwise groove 78 in the plate 35 for the guide bar 57 aligns with the groove 42 and has a depth such that the upper surfaces of the bar 57 and its spring 69 are flush with the top of the plate 35. However the spring 69 includes a lateral tab 79 matching a downwardly protruding lug 81 in the upper jaw 38 that will flatten down the spring when the jaws close together. A shallow recess 82 in the surface of the plate 35 at a relieved portion 83 of the shoulder 73 allow the tab 79 to slide for adjustments within the closed jaw set 12. In addition to the lug 81 the upper jaw 38 comprises a leaf spring 84 that is urged against the top of the strip 14 when the jaw 38 is lowered. The spring 84 is notched at 86 above the pin 72 so that, as the strip 14 is pulled slowly downstream by the sprocket 53 the pin slides into one of the holes 46. Once the pin 72 has entered a hole 46 in the strip 14 the downstream movement of the strip urges the bar 57 to move downstream within the jaw set 12, as explained above. By substitution of a thicker guide bar 87 (FIG. 8) and a flanged sliding pin 88 the leaf spring 84 may be omitted, within the scope of my invention. This becomes practicable because, when the pin 88 is spring mounted and retracts under slight pressure, not enough friction is created between the pin 88 and the moving strip to drag the bar 87 forward until the pin has entered one of the holes 46.

The leaf springs on the guide bars such as the spring 69 serve to dislodge the carrier strip from the bars when the jaws are finally open and for that reason there is an equivalent spring 91 on the upstream bar 43 but there is no need for the equivalent of the block 58 or upper-jaw leaf spring 84 since the jaw set 13 is set up manually.

OPERATION

Figure 3A:
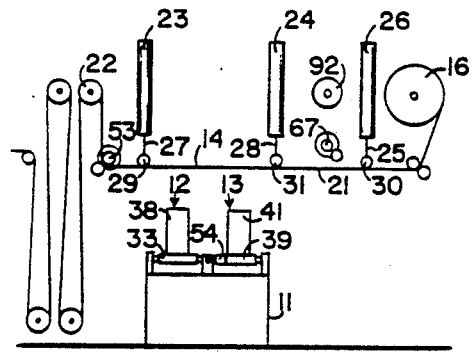
FIGS. 3a–3f are diagramatic representations of sequential changes in the positions of the elements of FIG. 1.

In FIG. 3A a diagram is given of the operating position of the elements of my apparatus during the periods between splices, before an operator has introduced a new roll of carrier strip. The pathway 21 of the strip 14 is determined by the sprocket 29 and piston 23, and the sprocket 30 and piston 26 of the previously introduced roll. There is a long period of attention-free operation during which the operator may introduce the next roll of strip 17. The pathway 21 is relatively high above the base 11 and both of the jaw sets 12 and 13 are open with the jaw 39 swung up and back from the jaw 33 and the jaw 41 swung away from the jaw 38.

Figure 3B:
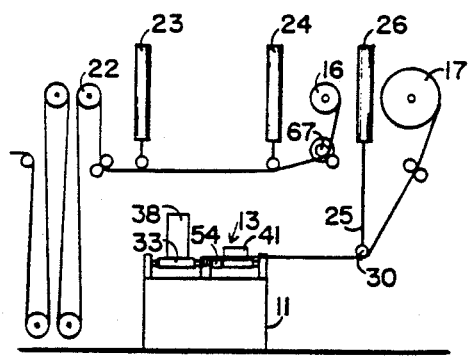

To introduce the new roll 17 in FIG. 3B an operator brakes the forward motion of the strip upstream of the accumulator 22, releases the strip from the sprocket 30 and puts the roll 16 on a hub 92, reengaging the strip around the sprocket 31 on the piston 28 of the cylinder 24. He also engages the strip from the roll 16 around the sprocket 67. Then the operator mounts a new roll 17 in place of the roll 16, manually turns a valve to lower the piston 25 with its sprocket 30 and threads the strip around that sprocket into the jaw set 13 where it is trimmed, by raising and lowering the jaw 33, and adjusted by hand in position to splice, in a known manner. My apparatus 10 then continues to perform without attention until after the roll 17 has been spliced to the roll 16 and it is time to introduce a new roll of strip.

Figure 3C:
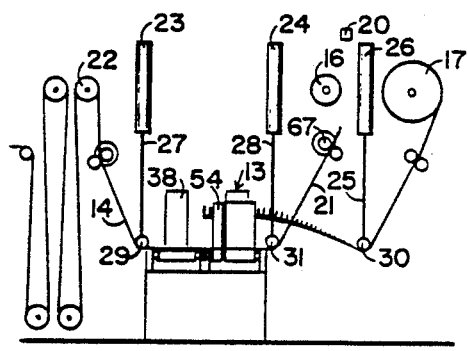

When the sensor 20 detects the end of the roll 16 it actuates the cylinder 48 to swing up the jaw set 13 (FIG. 3C), the motor 66 to brake the sprocket 67, and the sprocket pistons 23 and 24 to lower the sprockets 29, 31 so that the pathway 21 is directly above the jaw 33. With the sprocket 67 braked the necessary slack in the strip is drawn back from the accumulator 22.

Figure 3D:
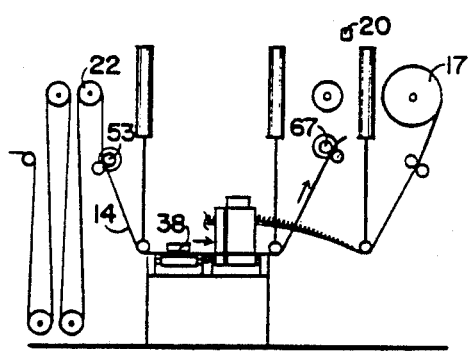

The upper jaw 38 is then brought down upon the jaw 33 (FIG. 3D) so that the spring 84 urges the strip 14 downward upon the pin 72 and the sprocket 53 is driven by the torque motor 56 to draw the strip 41 slowly forward as hereinabove described. When the pin has engaged a hole in the strip and the block 58 contacts the limit switch 64 the upstream sprocket 67 is driven by the torque motor 66 slowly to reverse the movement of the strip to its shearing position.

Figure 3E:
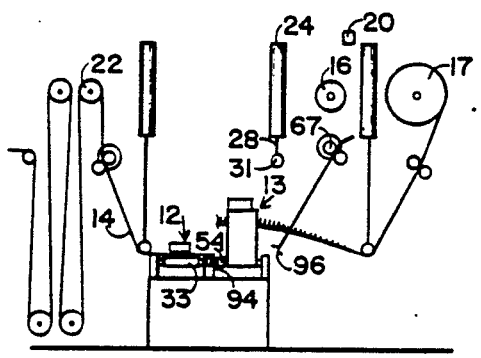

The strip 14 is then sheared by a blade 94 (FIG. 3E) on the lever arm 54, for which purpose the lever arm 54 is brought down (FIG. 3E) A metered length of solder 93 is paid in a known manner from a spool of solder (not shown) to lay upon the upper surface of the strip 14 while the strip continues to move downstream until the bar 57 is blocked at the soldering position, as has been described. Meanwhile a cut end 96 of the strip is carried upstream by the sprocket 67 and discarded.

Figure 3F:
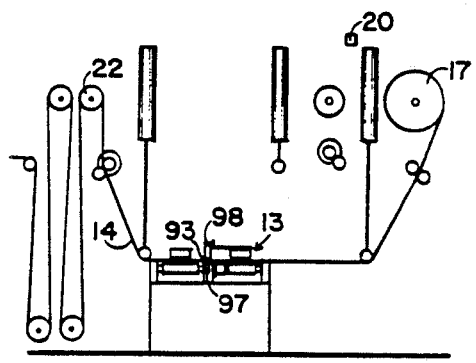
Figure 4:
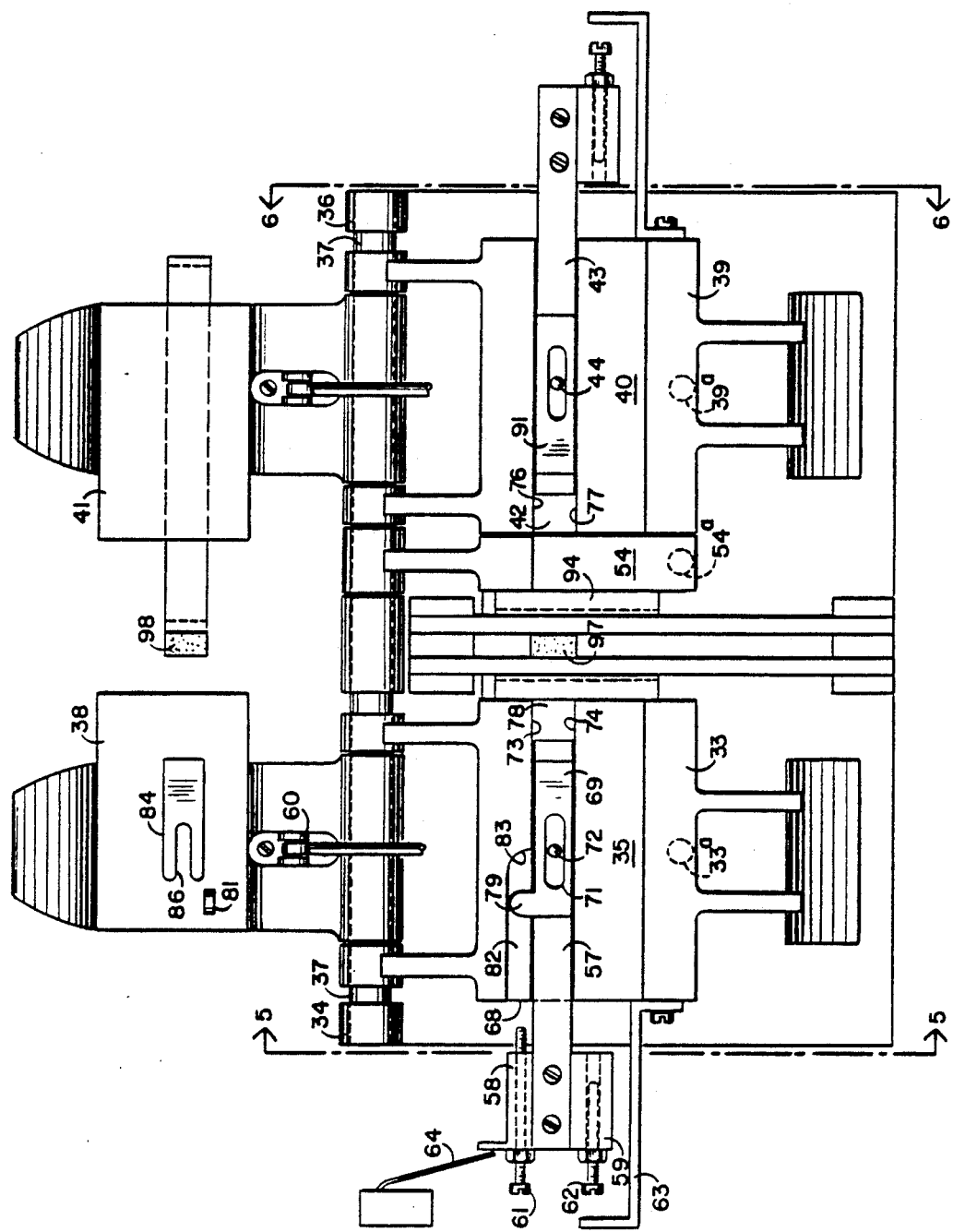
FIG. 4 is a plan view of the jaw sets of my apparatus with the upper jaws open flat.

The jaw set 13 is then lowered with the sheared end of the strip therein coming to rest upon the solder 93 (FIG. 3F). The solder and the sheared ends of the strips rest upon a carbon brush 97 in a known manner and another, matching, carbon brush 98, which is attached to, and lowered with, the jaw 41 descends over the intended splice. A short, timed flow of current is passed between the two brushes and the solder to effect fusion. The upper jaws 38 and 41 are then raised as are the sprockets 29, 30 so that the apparatus assumes the position of FIG. 3A.

The foregoing description has been exemplary rather than definitive of my invention for which I desire an award of Letters Patent as defined in the appended claims.

I claim:

1. An improved apparatus for splicing carrier strip which has a large plurality of elements projecting therefrom at regular intervals, said apparatus comprising:
    at least one cutting blade for the strip,
    grooved guide plates for the strip,
    two guide bars aligned end-to-end and slidably fitting the grooves of the plates, the bars comprising means for engaging said strip,
    downstream and upstream sets of upper and lower cooperating jaws, the lower of each of each of the sets of jaws comprising one of the plates,
    supplies of continuous lengths of strip,
    means directing the strip in a pathway to another location, my apparatus aligning and connecting a trailing end of one supply to the leading end of another supply, the improvement comprising:
    (A) automatic means for changing the pathway to a position closely aligned above the downstream of the bars,
    (B) automatic means for determining the proximity of the trailing end,
    (C) means actuated by the sensing means, for pressing the strip from its pathway so as to engage the strip with the downstream bar,
    (D) means for sensing the engagement of the strip to the downstream bar,
    (E) automatic means, actuated by the engagement-sensing means, for cutting the trailing end of the strip, advancing solder across the trailing and leading ends, and fusing the solder to join together both supplies.

2. The apparatus improvement of claim 1 wherein said forward bar comprises at least one upwardly projecting pin, said strip comprises walls defining a plurality of regularly spaced openings and said pressing means presses one of said openings over said pin.

3. The apparatus of claim 2 wherein the forward movement of engaged strip advances said downstream bar and said engagement sensing means comprises means for sensing said advancing.

4. The apparatus of claim 2 wherein said directing means comprises a frame, vertically adjustable supports mounted on said frame, rotatable guides for said strips, said guides being mounted on said supports, and automatic means, actuated by the determination of said proximity, for raising and lowering said supports.

5. The apparatus of claim 1 wherein said directing means comprises a frame, vertically adjustable supports mounted on said frame, rotatable guides for said strip, said guides being mounted on said supports, and automatic means, actuated by the determination of said proximity, for raising and lowering said supports.

6. The apparatus of claim 1 comprising automatic means for raising and lowering the upper of said downstream jaws, the lower of said upstream jaws, and the upper of said upstream jaws.

7. The apparatus of claim 1 comprising automatic means, actuated by the determination of said proximity, for temporarily slowing down the forward motion of said strip.

8. The apparatus of claim 2 wherein said upper downstream jaw comprises a downwardly extending spring means, said spring means urging said strip down upon said pin.

9. The apparatus of claim 2 wherein said downstream bar comprises an upwardly facing leaf spring urging said strip upwardly from said pin and thereby releasing said strip when said downstream set of jaws is opened.

10. The apparatus of claim 2 wherein said bar comprises spring means under said pin, said pin being easily depressable against said spring means.

11. The method of splicing carrier strip comprising walls that define a plurality of regularly spaced openings said method comprising the steps of:
    (A) aligning two flat horizontal slidable guide bars end to end, the guide bars each being held in the lower of a set of jaws and comprising at least one upwardly projecting pin,
    (B) passing a moving strip of a supply of the carrier strip in a pathway clear of the jaws,
    (C) fitting the leading end of a supply of the carrier strip to an upstream of the guide bars,
    (D) automatically sensing the terminal end of the moving strip and thereby initiating the following additional automatic steps:
    (E) raising the upper jaw of the downstream of the sets of jaws thereby exposing the downstream of the bars, (F) lowering the pathway to a position closely above the downstream of the bars, (G) pressing one of the openings over the pin thereby causing the downstream bar to slide forward with the strip, (H) sensing the forward motion of the downstream bar and thereupon applying upstream tension to the strip and sliding the strip into position for shearing off the terminal end thereof, (I) lowering a blade and thereby shearing off the terminal end, (J) projecting solder across the upper surface of the strip, (J) advancing the strip to a position where the cut end thereof remains under the solder, (K) lowering the upstream jaw set and thereby placing the cut end of the upstream carrier strip upon the solder slightly spaced from the cut end of the downstream carrier strip, (L) heating both of the ends and thereby joining the strips.

* * * * *